UNITED STATES PATENT OFFICE.

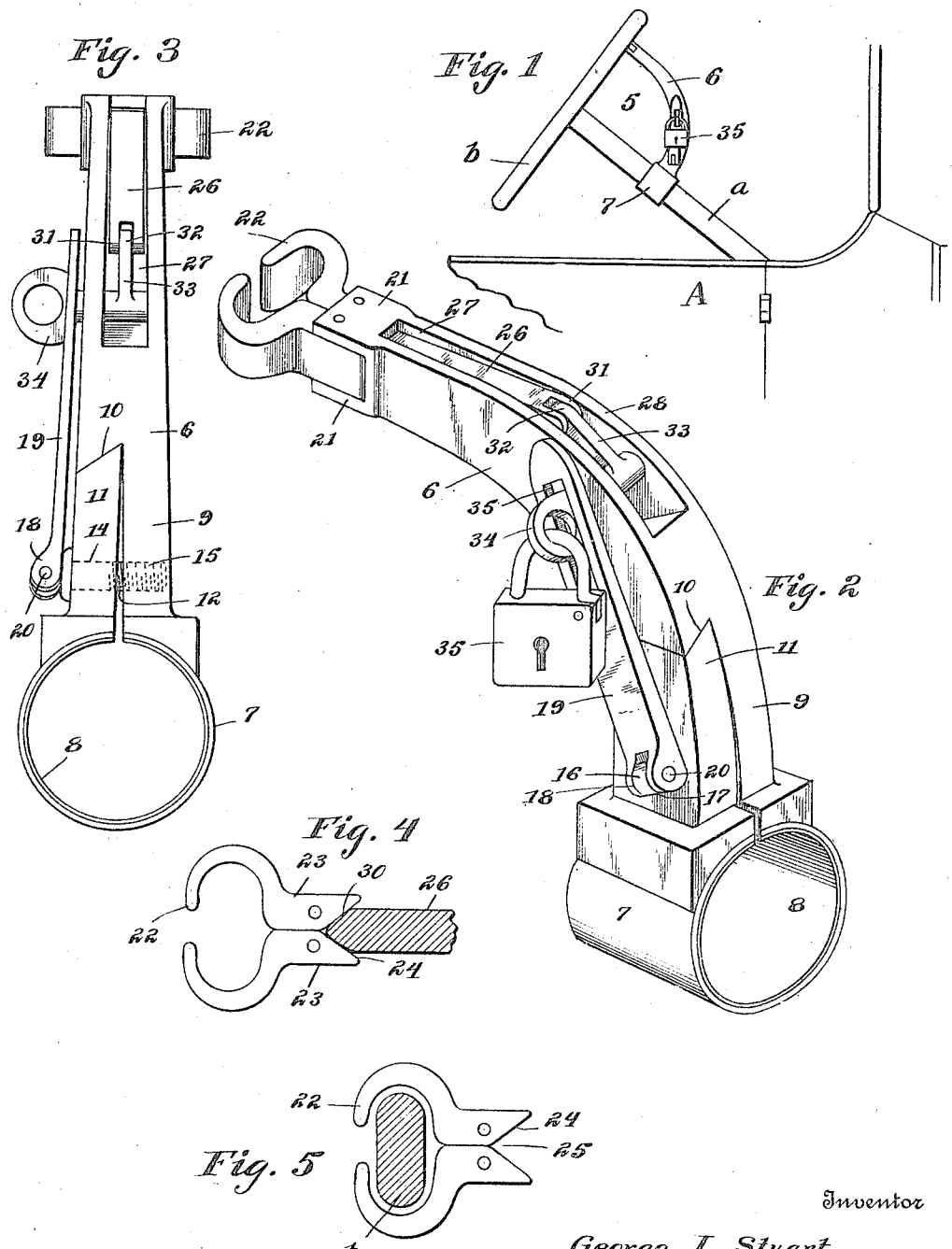

GEORGE L. STUART, OF BERLIN, NEW HAMPSHIRE.

AUTOMOBILE-LOCK.

1,247,594.  Specification of Letters Patent.  Patented Nov. 20, 1917.

Application filed March 23, 1916. Serial No. 86,253.

*To all whom it may concern:*

Be it known that I, GEORGE L. STUART, a citizen of the United States, residing at Berlin, in the county of Coos and State of New Hampshire, have invented new and useful Improvements in Automobile-Locks, of which the following is a specification.

This invention is concerned with locks for automobiles, and is designed to produce a simple and effective lock, permanently attached, preferably to the steering column of the machine, and so constructed and locked that the driver can quickly and with minimum of effort lock the machine so as to prevent the theft of the same by unauthorized parties not having the key to unlock the machine, and it is further designed so that it can be substantially as well as readily unlocked, and thrown out of action by the party possessing the key.

To this end, use is made of a solid bracket arm so constructed to adapt the same in being detachably connected to the stationary sleeve or post surrounding the steering post of an automobile, a latch mounted in the slot of the arm, and adapted to lock the clamping members of the arm to the spokes of the steering wheel.

It is also my purpose to improve and simplify the general construction of automobile locking devices, and to provide a lock which may be manufactured at a minimum expense.

With the above and other objects in view, the invention consists in the novel features, details of construction, and combination of parts which will hereinafter be more fully set forth, illustrated in the accompanying drawings, and pointed out in the appended claims.

Figure 1 is a fragmentary side elevation of a motor vehicle showing my improved locking device connected therewith and in locking action;

Fig. 2 is a perspective view of the locking device detached from the machine;

Fig. 3 is an end view;

Fig. 4 is a detail transverse section showing the manner of engagement of the latch bar with the clamping jaws; and Fig. 5 is a detail view showing the hasp locked to the bracket arm.

Referring now to the drawing in detail, A designates the body of a motor vehicle equipped with the usual steering column *a*, and steering wheel *b*, whereby the front wheels of the motor vehicle may be turned in opposite directions to warrant of the proper steering of the vehicle.

My improved locking device is designated as an entirety by the reference character 5, providing a curved bracket arm 6, provided at its innermost end with a substantially oval-shaped yieldable clamping member 7. The purpose of this clamping member, as will be obvious from the drawing, is to facilitate the attachment of the locking device 5 to the steering post *a* and adapted to frictionally engage therewith, owing to the fact that the clamping member is provided with a lining 8. The portion 9 of the bracket arm which connects the clamping member 7 thereto, is of lesser thickness than the remaining portion of the bracket arm, and the point of intersection of the connecting portion 9 with said bracket arm presents a substantially vertically disposed groove 10 of V-shaped configuration in cross section, and is adapted to receive the beveled free end 11 of the clamping member, in order to prevent any undue strain on the connecting bolt 12. This connecting bolt passes transversely through the free end 13 of the clamp, and through the connecting portion 9 respectively, and threadedly engages in the openings 14 and 15 of the respective members, whereby detachably and permanently connecting the locking device to the steering column and adapting the same to be readily attached or disconnected therefrom, as the occasion may so demand. This connecting bolt is formed with a reduced head 16 formed with a transverse aperture 17. The spaced ears 18 formed on the innermost end of the hasp 19 straddle the reduced head 16 of the connecting bolt, and are pivotally connected thereto for vertical swinging movement through the medium of the pivotal pin 20. The top and bottom surfaces of the bracket arm 6 are continued beyond the upper end of the opposite side faces of the bracket arm, and are disposed in spaced relation therewith to provide spaced ears 21. Pivotally mounted between the ears 21 for a horizontal swinging movement, is a pair of jaws 22, and the confronting faces of the jaws are adapted to clamp with one of the spokes of the steering wheel when the vehicle is in locked position. The opposite or confronting faces of the shank portions 23 of the jaws, at the lower extremities thereof, are beveled as at 24 to provide a substantially V-shaped slot 25, the purpose of which will be hereinafter more clearly set forth. In order to perfect the locking of the jaws 22 to the steering wheel spokes, I provide a latch 26. This latch is in the form of a rod having the general contour or curvature of that of the bracket arm 6, and is operatively seated within the arcuate slot 27 formed in the convexed front face 28 of the bracket arm. The active or upper end of the latch 26 is formed with beveled side walls 30 forming the same with a pointed extremity of substantially inverted V-shaped configuration in cross section, and adapted to snugly engage with the inverted V-shaped slot 25 of the jaws 22, as will be apparent from the drawing. The opposite or lower end of the latch 26 is provided with spaced ears 31, having pivotally connected therebetween the reduced portion 32 of a link 33. A thumb nut 34 is rotatably mounted in one of the side faces of the arm, and has permanent connection with the link, whereby upon rotation of the thumb nut 34 in one direction, operates the link 33 beyond the plane of the convexed face 28 of the arm, and withdraws the active end of the latch from engagement with the slot of the jaws 22, and causes the unlocking of the jaws from the steering wheel of the vehicle. On the other hand, if it is desired to lock the jaws, by the rotation of the thumb nut 34 in an opposite direction, will create a swinging movement of the link 33 within the arcuate groove 27 of the arm, in turn throwing the latch within such groove and moving the latter in an upward direction until the active end of the latch, or the beveled portion 30 thereof firmly engages with the V-shaped slot 25 of the jaws. After the jaws have been locked to the steering wheel by the action just described, and in order to prevent the unlocking of the motor vehicle, that is, the jaws 22 from one of the spokes of the steering wheel, the slot 35 of the hasp 19 is thrown over the thumb nut 34, and a pad lock, or any other suitable type of lock, designated by the reference character 35, is thence supplied to the eye 36 of the thumb nut, the party possessing the key thence locking the lock 35, and thereby preventing the vehicle being readily driven away by unathorized persons not having possession of the key.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such advantages may be made when desired as are within the scope of the claims appended thereto.

I claim:

1. A lock for the steering wheel of motor vehicles comprising a bracket arm, means for clamping the bracket arm to the steering post, clamping jaws pivotally connected to said arm, an operating member rotatably mounted on the arm, means connected with the operating member for holding the jaws in closed position, and means pivotally connected with the arm connecting means and with said operating member for holding the jaws in a closed locked position.

2. A lock for the steering wheel of motor vehicles embodying a bracket arm, means for clamping the bracket arm to the steering post, clamping jaws pivotally connected to said arm, an operating member rotatably mounted on the arm, means connected with the operating member for holding the jaws in closed position, and a slotted member connected with the arm connecting means for vertical swinging movement, a portion of the said operating member protruding through the slot of the latter mentioned member for holding the jaws in a closed locked position.

3. A lock for the steering wheel of motor vehicles comprising a bracket arm, means for connecting the arm to the steering post, clamping jaws carried by said arm, a latch operable in a slot formed in said arm and co-acting with said jaws, a member rotatably mounted in said arm and having pivotal connection with the free end of said latch, and means carried by the arm connecting means and engaging with the last mentioned member for holding the latch against movement.

In testimony whereof I affix my signature in presence of two witnesses.

GEORGE L. STUART.

Witnesses:
 EDWARD WARD STEADY,
 ANNIE M. STUART.

Copies of this patent may be obtained for five cents each, by addressing the "Commissioner of Patents, Washington, D. C."